Dec. 30, 1924.  1,521,428
G. F. BULL
MEANS FOR ADJUSTING SHAFTS
Filed June 2, 1922    3 Sheets-Sheet 1

Inventor
George F. Bull
By
Attorney

Dec. 30, 1924.
G. F. BULL
1,521,428
MEANS FOR ADJUSTING SHAFTS
Filed June 2, 1922      3 Sheets-Sheet 3
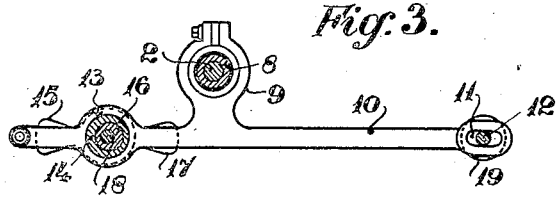
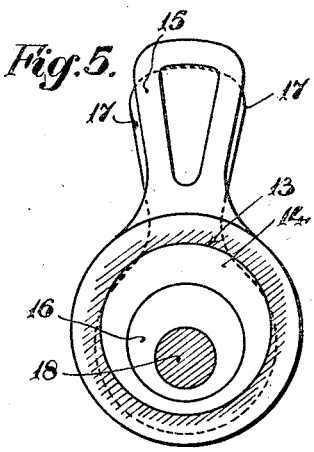
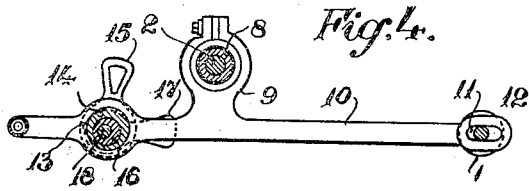
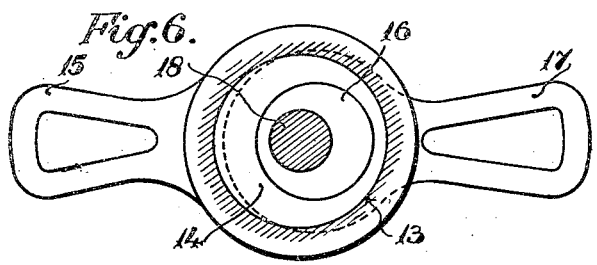
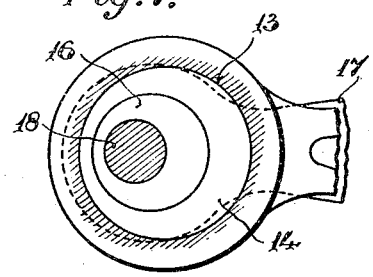
Inventor
George F. Bull Patented Dec. 30, 1924.

1,521,428

UNITED STATES PATENT OFFICE.

GEORGE FREDERICK BULL, OF BIRMINGHAM, ENGLAND, ASSIGNOR OF ONE-HALF TO CHARLES H. PUGH LIMITED, OF BIRMINGHAM, ENGLAND.

MEANS FOR ADJUSTING SHAFTS.

Application filed June 2, 1922. Serial No. 565,412.

*To all whom it may concern:*

Be it known that I, GEORGE FREDERICK BULL, director, subject of the King of Great Britain, residing at Birmingham, England, have invented certain new and useful Improvements in Means for Adjusting Shafts, of which the following is a specification.

This invention relates to means for adjusting shafts in general such as for the purpose of adjusting the tension of driving chains or belts, or otherwise, but relates more particularly to the adjustment of those shafts forming the lay shaft in a transmission system wherein the power is transmitted from the driving shaft to the driven shaft through the intermediary of the lay shaft, the arrangement being such that the respective planes of the centres of the driving shaft and lay shaft, and lay shaft and driven shaft are angularly disposed relatively to each other.

The object of this invention is to provide improved means for the purpose above referred to.

According to this invention I provide improved means for adjusting shafts comprising a pair of eccentrics mounted one within the other and arranged to adjust either the shaft itself or a member carrying the same.

Figure 3 is a front elevation of one of the rocking members detached, showing the eccentrics in one position, and Figure 4 is a similar view showing one of the eccentrics moved into another position.

Figures 5, 6 and 7 show the eccentrics detached, and in various positions relatively to each other.

Figure 1:
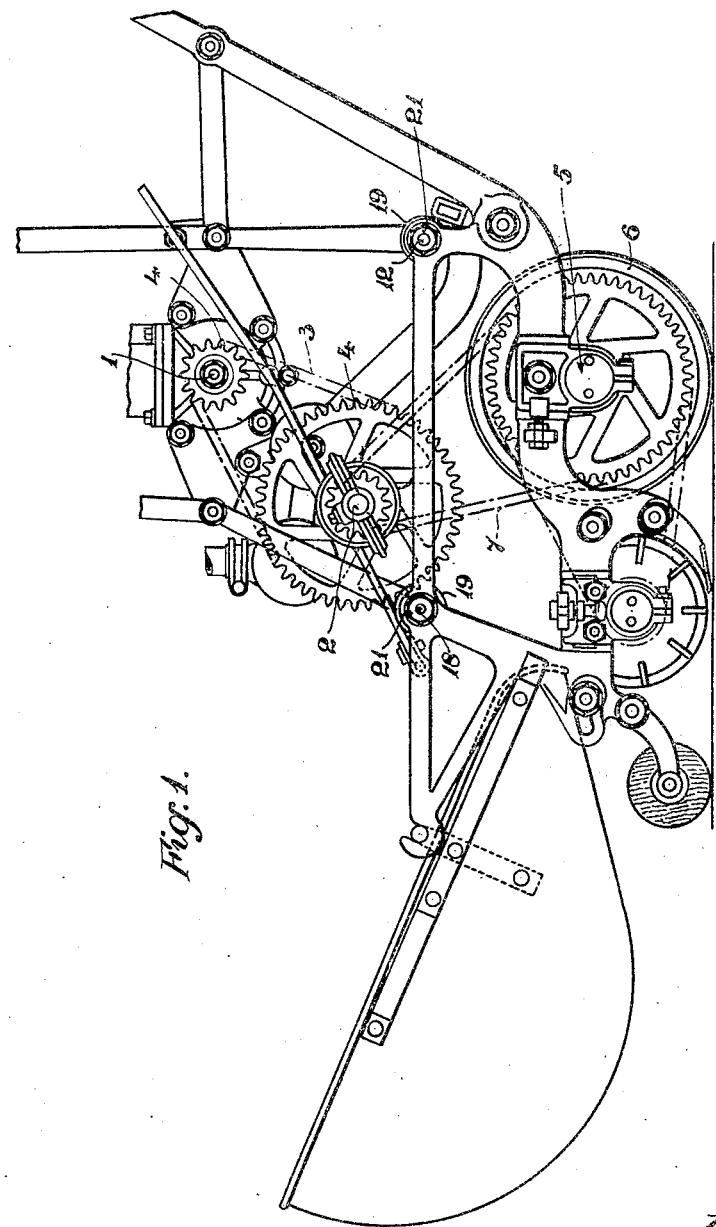
Figure 1 is a side elevation of a power-driven lawn-mower to which my invention is applied.
Figure 2:
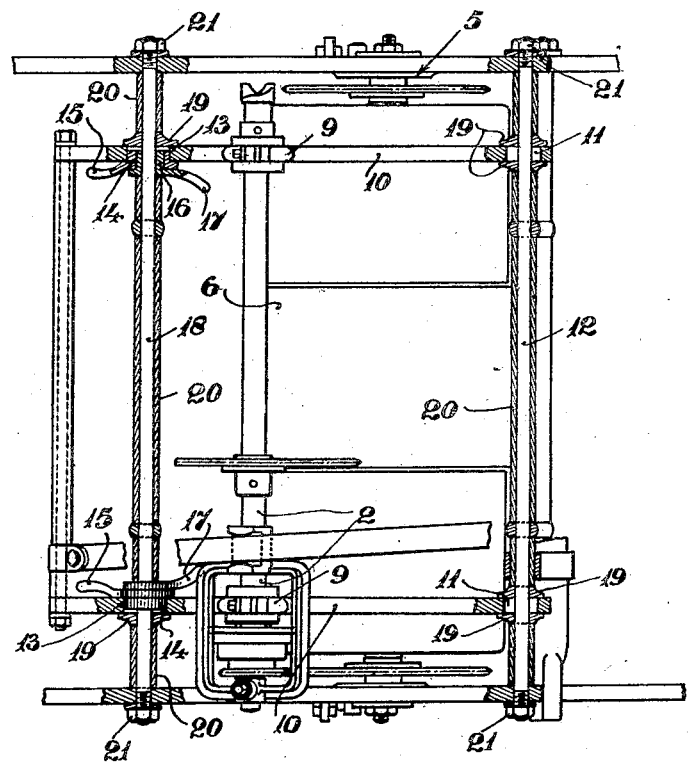
Figure 2 is a part sectional plan thereof.

In carrying out the invention it may be applied to shafts used for various purposes, but I will describe it by way of example as applied to the lay shaft of a power driven lawn mower such as shown in Figure 1. In this machine the power is transmitted from the engine shaft 1 to the lay shaft 2 through the medium of chains 3 passing over the sprocket wheels 4 mounted on the shafts, and similarly from the lay shaft to the driven shaft 5, i. e., the shaft of the ground rollers 6 by means of chains 7. Thus by adjusting the lay shaft 2 the tension upon one or both sets of chains can be adjusted as required.

The lay shaft 2 is journalled in anti-friction bearings 8 mounted in housings 9 carried by a pair of rocking members 10 disposed longitudinally of the machine, the said housings being split and adapted to be contracted upon the outer races of the bearings to hold same firmly in position as is clearly shown at Figures 3 and 4. Each of these longitudinal members is provided adjacent one end thereof with an elongated slot 11 through which one of the transverse tie rods 12 of the machine passes, the width of the slot being equal to that of the tie-rod so that the said member is free to move longitudinally relatively to the tie-rod and also to pivot about the same. Adjacent the opposite end of each longitudinal member a large circular transverse aperture 13 is disposed into which a circular boss 14 upon one face of a lever 15 fits, so that it is free to rotate therein. This boss has passing through same an eccentric circular passage into which fits a boss 16 upon one face of a second lever 17 so that this also is free to rotate. Passing through this latter boss is also an eccentric circular aperture of the same diameter as one of the fixed transverse tie-rods 18 of the machine which passes therethrough and supports the two eccentrics so formed, and thus the end of the rocking member 10 carried thereby.

The two eccentrics 14 and 16 revolve around the said tie rod 18 and are arranged relatively to each other so that by moving one lever the rocking member 10 is moved endwise, and by moving the other lever it is rocked about the tie-rod 12 passing through the aforesaid elongated slot 11. Thus by a combination of the two movements the shaft 2 carried by the rocking member 10 can be moved into any position so that the tension on one or both of the chains 6 and 7 can be adjusted.

To lock the rocking members 10 in their adjusted positions washers 19 are provided upon one or both sides of the eccentrics, these washers being pressed against same by means of distance sleeves 20 under the influence of nuts 21 screwed on to the ends of the tie-rods 12 and 18.

It will be understood that the above application is only given by way of example, and that the invention is equally applicable to the adjustment of various shafts used for other purposes.

Having fully described my invention what I desire to claim and secure by Letters Patent is:—

1. Means for adjusting a shaft, comprising two fixed members, a pair of eccentrics rotatable one within the other and upon one of the fixed members, and a shaft-carrying member supported by the eccentrics and the other fixed member and adapted for angular movement about and longitudinal movement relative to the latter fixed member.

2. Means for adjusting a shaft, comprising two fixed members, an eccentric rotatably mounted upon one of the fixed members, a second eccentric having a housing within which the first eccentric is rotatably mounted, a shaft-carrying member having a housing within which the second eccentric is mounted to rotate for supporting said shaft carrying member at one point, the said shaft-carrying member being supported at another point by the second fixed member for angular movement about and longitudinal movement relative to the latter fixed member.

3. Means for adjusting shafts, comprising a shaft carrying member having a longitudinal slot in one end thereof, a tie-bar extending through said slot and supporting said end of the member for endwise and angular movement about the tie-bar; a housing carried by the opposite end of the member, an eccentric disposed in the said housing, said eccentric, a second eccentric having a housing formed therein disposed in the latter housing and having an aperture passing axially therethrough, a tie-bar passing through the said aperture and supporting the eccentrics, and means for rotating the said eccentrics in order to move the said member in the required direction.

In testimony whereof he has hereunto set his hand in presence of two subscribing witnesses.

GEORGE FREDERICK BULL.

Witnesses:
W. S. SKERRETT,
W. N. SKERRETT.